(12) United States Patent
Spencer et al.

(10) Patent No.: US 12,103,472 B1
(45) Date of Patent: Oct. 1, 2024

(54) LICENSE PLATE COVER CLIP

(71) Applicant: Cruiser Accessories, LLC, Monument, CO (US)

(72) Inventors: Todd R. Spencer, Monument, CO (US); Mark Hunter Basenberg, Jr., Colorado Springs, CO (US)

(73) Assignee: Cruiser Accessories, LLC, Monument, CO (US)

( * ) Notice: Subject to any disclaimer, the term of this patent is extended or adjusted under 35 U.S.C. 154(b) by 0 days.

(21) Appl. No.: 18/497,710

(22) Filed: Oct. 30, 2023

(51) Int. Cl.
*B60R 13/10* (2006.01)
*F16B 2/22* (2006.01)

(52) U.S. Cl.
CPC ............. *B60R 13/105* (2013.01); *F16B 2/22* (2013.01)

(58) Field of Classification Search
CPC ................................ B60R 13/105; F16B 2/22
See application file for complete search history.

(56) References Cited

U.S. PATENT DOCUMENTS

| | | | |
|---|---|---|---|
| 1,914,773 A * | 6/1933 | Fisher | B60R 13/105 411/315 |
| 5,381,618 A | 1/1995 | Singleton | |
| 5,879,117 A * | 3/1999 | Chen | B60R 13/105 411/372.6 |
| 6,519,882 B1 | 2/2003 | Shuen | |
| D492,633 S | 7/2004 | Wales | |
| D608,626 S | 1/2010 | Camisasca | |
| D609,082 S | 2/2010 | Camisasca | |
| 7,713,012 B2 | 5/2010 | Coonjohn | |
| D621,254 S | 8/2010 | Camisasca | |
| 8,051,690 B2 | 11/2011 | Camisasca | |
| 8,291,627 B1 | 10/2012 | Spencer et al. | |
| 8,578,640 B1 | 11/2013 | Krankkala et al. | |
| 8,650,780 B2 | 2/2014 | Spencer et al. | |
| 8,938,896 B2 | 1/2015 | Spencer et al. | |

(Continued)

FOREIGN PATENT DOCUMENTS

FR   3050413 A1   10/2017
TR   3050413 A1   10/2017

OTHER PUBLICATIONS

Cruiser, Cruiser Accessories License Plate Frame RAM Chrome, Mar. 22, 2023.

(Continued)

*Primary Examiner* — Gary C Hoge
(74) *Attorney, Agent, or Firm* — Stanley J. Gradisar Attorney At Law, LLC; Stanley J. Gradisar

(57) ABSTRACT

License plate frames typically have four screw holes that receive screws to secure the license plate and the license plate frame to the vehicle. The current invention allows a user to apply cover clips to hide the screws. The license plate frame is designed to work with the cover clips, so the cover clips will only work on the specially designed license plate bracket. The cover clips are slid down onto the license plate brackets on the bottom of the license plate frame, and they are slid up on the license plate brackets on the top of the license plate frame. The cover clip is a one-piece solution with no "moving" parts other than the bowing outwards when forced onto the license plate brackets. The cover clip is applied with force in a parallel direction to the license plate frame, sliding down or up onto the license plate brackets.

6 Claims, 7 Drawing Sheets

(56) References Cited

U.S. PATENT DOCUMENTS

| | | | |
|---|---|---|---|
| D752,493 S | 3/2016 | Spencer et al. | |
| 9,663,044 B2 | 5/2017 | Hernandez De Luna et al. | |
| 10,821,888 B2 | 11/2020 | Kidakarn et al. | |
| 10,836,331 B1 | 11/2020 | Lee et al. | |
| 10,843,642 B2 | 11/2020 | Camisasca | |
| 10,916,162 B2 | 2/2021 | Chenault et al. | |
| 2007/0289175 A1 | 12/2007 | Blodgett | |
| 2008/0178502 A1 | 7/2008 | Stuchell | |
| 2008/0292428 A1* | 11/2008 | Coonjohn | B60R 13/00 411/372.6 |
| 2011/0214461 A1 | 9/2011 | Camisasca | |
| 2015/0321624 A1* | 11/2015 | Parenti | F16B 41/005 248/551 |
| 2017/0080785 A1* | 3/2017 | Azarko | B60R 13/105 |
| 2019/0291662 A1 | 9/2019 | Camisasca | |
| 2020/0182277 A1* | 6/2020 | Peng | F16B 5/0088 |

OTHER PUBLICATIONS

Roane Auto Parts, Chrome License Plate Frame Screw Covers/Cap/Fasteners, Mar. 22, 2023.

* cited by examiner

LICENSE PLATE COVER CLIP

BACKGROUND

License plates are often secured to a vehicle by way of a license plate frame that fits over the license plate. The license plate frame has holes that align with the holes in the license plate so that screws can pass through the aligned holes and attach the license plate and frame to the vehicle. Many vehicle owners find the visible screws that attach the license plate and frame to the vehicle to be aesthetically unpleasing. There is a need in the art for a way to hide the screws to present a more attractive appearance.

SUMMARY

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

The detailed description below describes a new way to hide the screws that hold a license plate frame and license plate to a vehicle.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or class of elements, such as X1-Xm, Y1-Yn, and Z1-Zo, the phrase is intended to refer to a single element selected from X, Y, and Z, a combination of elements selected from the same class (e.g., X1 and X2) as well as a combination of elements selected from two or more classes (e.g., Y1 and Z3).

It is to be noted that the term "a entity" or "an entity" refers to one or more of that entity. As such, the terms "a" (or "an"), "one or more," and "at least one" can be used interchangeably herein. It is also to be noted that the terms "comprising," "including," and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Disclosed is a new and unique way to hide the screws that hold a license plate to a vehicle. License plate frames typically have four screw holes that receive screws to secure the license plate and the license plate frame to the vehicle. The current invention allows a user to apply decorative and/or plain cover clips to hide the screws. The cover clips may be plain or decorative and can be of many different designs and styles. All plain cover clips may be used, or all decorative cover clips may be used, or a combination of both. The license plate frame is designed to work with the cover clips, so the cover clips will only work on the specially designed license plate frame. The cover clips are slid down onto the license plate brackets on the bottom of the license plate frame, and they are slid up on the license plate brackets on the top of the license plate frame. There are two unique features about the cover clip. One, the cover clip is a one-piece solution with no "moving" parts other than the bowing outwards when forced onto the license plate brackets. Second, the cover clip is applied with force in a parallel direction to the license plate frame, sliding down or up onto the license plate brackets. Other types of prior art cover clips are applied with force that pushes perpendicular to the license plate frame. This parallel direction makes a much more secure attachment, and the cover clips are less likely to come off.

Figure 1:
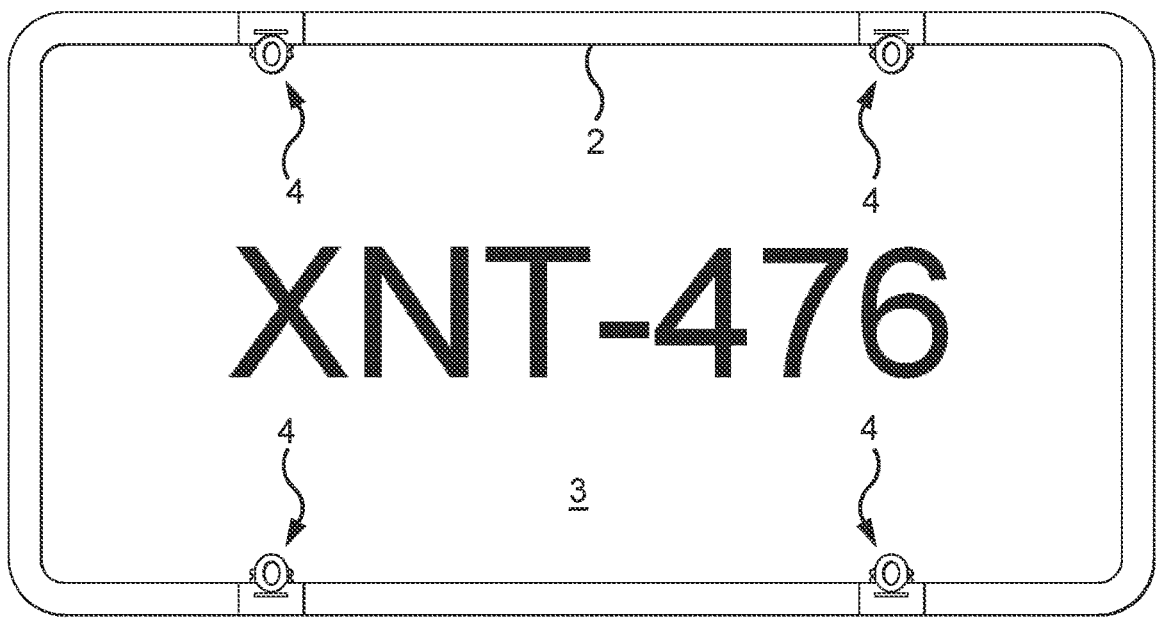
FIG. 1 shows a front view of a license plate frame having four specially designed brackets for receiving screws and for receiving cover clips to hide the screws from view in an embodiment of the invention.

To assist in the understanding of the present disclosure the following list of components and associated numbering found in the drawings is provided herein:

| Table of Components | |
| --- | --- |
| Component | # |
| license plate frame | 2 |
| license plate | 3 |
| brackets | 4 |
| opening | 6 |
| tabs | 8 |
| notches | 10 |
| raised bar | 12 |
| cover clip | 14 |
| raised catch bar | 16 |
| channels | 18 |
| raised portion | 19 |
| cover clip | 20 |
| channels | 22 |
| raised portion | 23 |
| raised nub | 24 |
| cover clip | 26 |
| channels | 28 |
| raised portion | 29 |
| raised nub | 30 |

DETAILED DESCRIPTION

Referring now to the Figures, like reference numerals and names refer to structurally and/or functionally similar elements thereof, and if objects depicted in the figures that are covered by another object, as well as the tag line for the element number thereto, may be shown in dashed lines. FIG. 1 shows a front view of a license plate frame having four specially designed brackets for receiving screws and for receiving cover clips to hide the screws from view in an embodiment of the invention. Referring now to FIG. 1, license plate frame 2 has four specially designed brackets 4 that are formed into the license plate frame 2 as one unitary piece with no moving parts. License plate frame 2 is installed over license plate 3 and the openings 6 in the four specially designed brackets 4 align with four holes in the license plate 3.

Figure 2A:
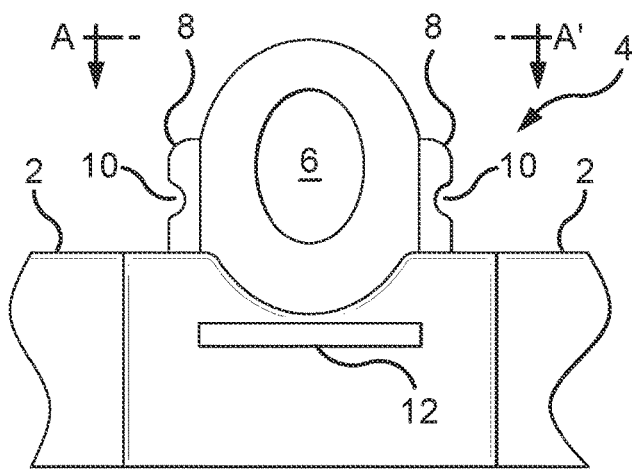
FIG. 2A shows an enlarged front view of one of the brackets shown in FIG. 1 in an embodiment of the invention.
Figure 2B:
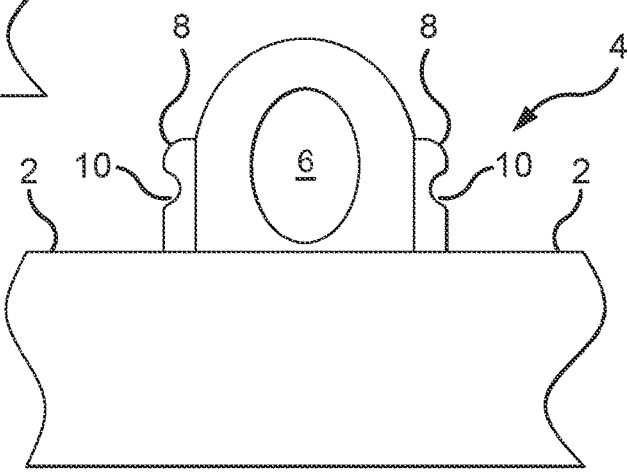
FIG. 2B shows an enlarged back view of one of the brackets shown in FIG. 1 in an embodiment of the invention.
Figure 2C:
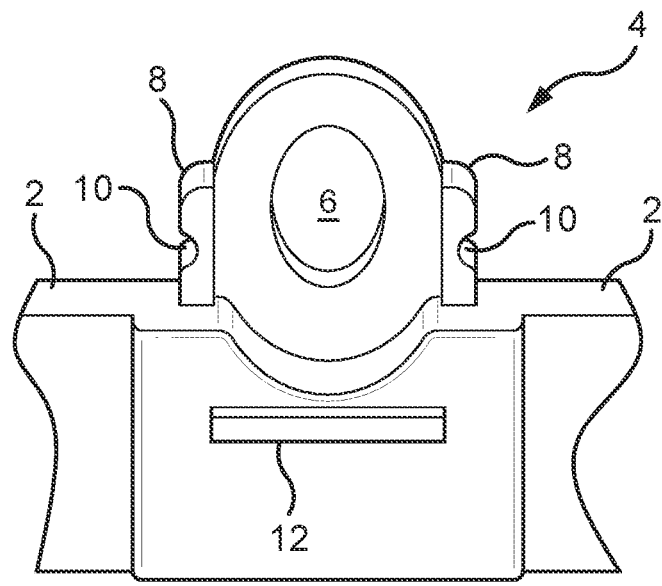
FIG. 2C shows an enlarged slight perspective view of one of the brackets shown in FIG. 1 in an embodiment of the invention.
Figure 2D:
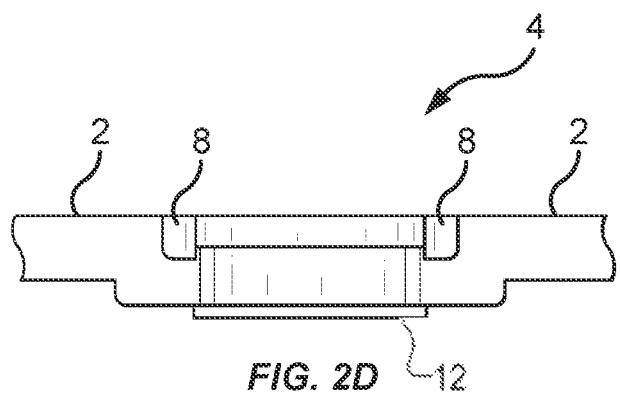
FIG. 2D shows an enlarged top view of one of the brackets shown in FIG. 1A viewed along line A-A' in an embodiment of the invention.

FIG. 2A shows an enlarged front view of one of the brackets shown in FIG. 1 in an embodiment of the invention. FIG. 2B shows an enlarged back view of one of the brackets shown in FIG. 1 in an embodiment of the invention. FIG. 2C shows an enlarged slight perspective view of one of the brackets shown in FIG. 1 in an embodiment of the invention. FIG. 2D shows an enlarged top view of one of the brackets shown in FIG. 1A viewed along line A-A' in an embodiment of the invention. Referring now to FIGS. 2A, 2B, 2C, and 2D, brackets 4 have an opening 6 that aligns with the preexisting holes in the license plate 3 such that a screw or bolt may pass through opening 6 of brackets 4 and through the holes in the license plate to secure both to the vehicle (not shown). Each bracket 4 has two tabs 8 located on opposite sides of bracket 4. The tabs 8 have a slight taper such that the bottom part of the tabs 8 toward the base of the license plate frame 2 is wider than the top part of the tabs 8 farther away from the base of the license plate frame 2. Each of the tabs 8 has a notch 10 closer to the base of the license plate frame 2. Each of the brackets 4 have a raised bar 12 on the license plate frame 2 below the brackets 4.

Figure 3A:
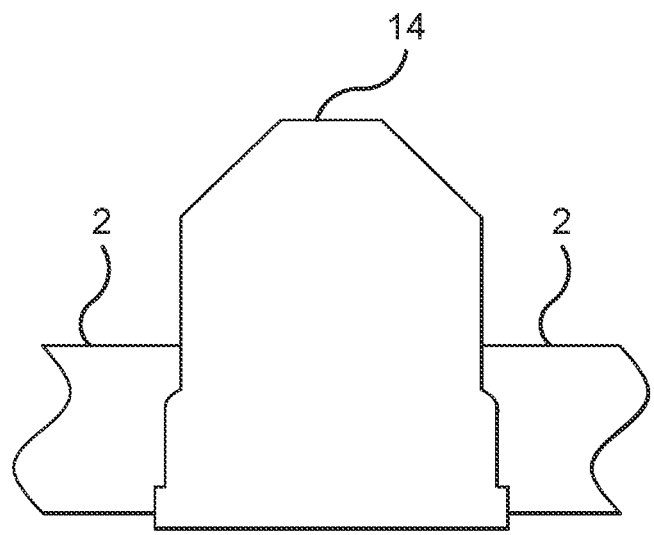
FIG. 3A shows a front view of a first style of a cover clip attached to the license plate frame in an embodiment of the invention.
Figure 3B:
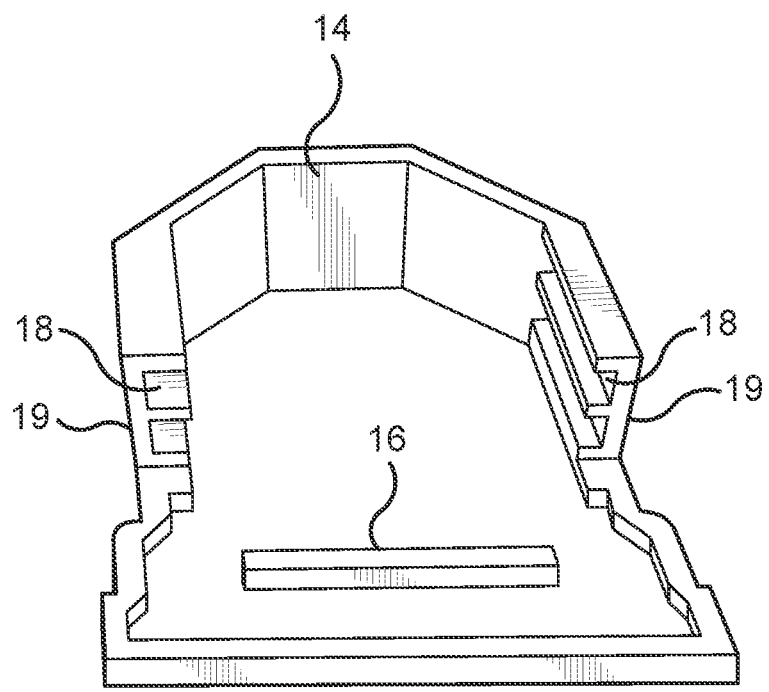
FIG. 3B shows a perspective view of the back side of the cover clip shown in FIG. 3A in an embodiment of the invention.
Figure 6:
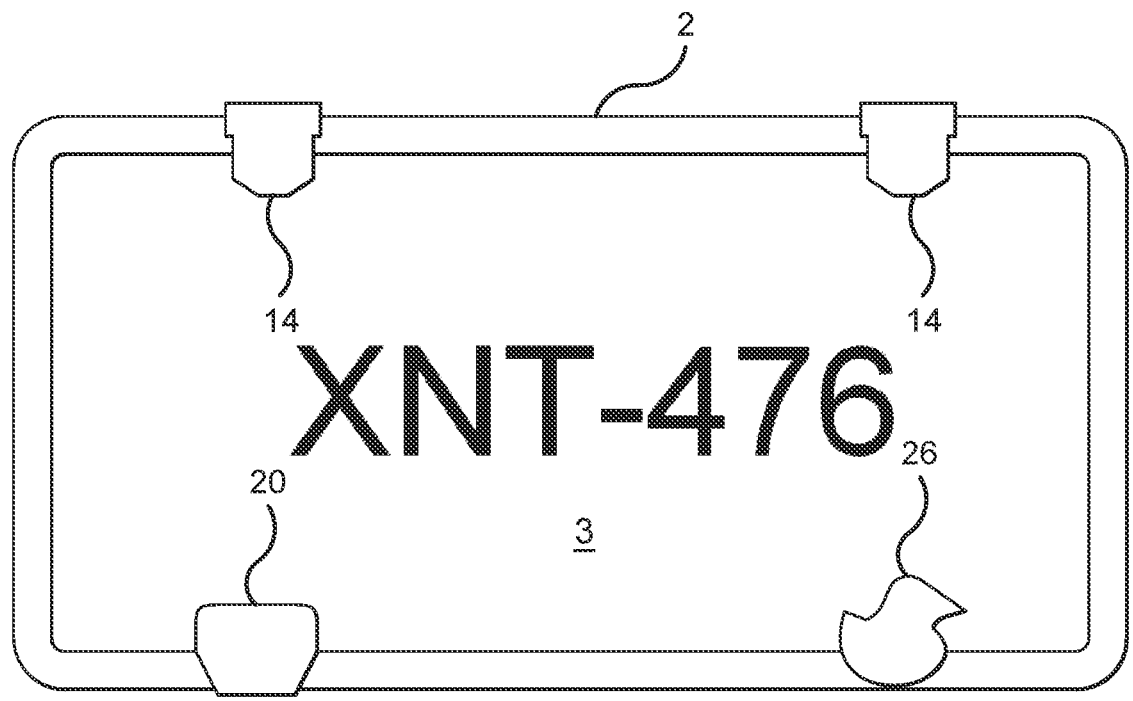
FIG. 6 shows a front view of a license plate frame having the cover clips shown in FIGS. 3A, 4A, and 5A attached to the specially designed brackets of the license plate frame shown in FIG. 1 in an embodiment of the invention.

FIG. 3A shows a front view of a first style of a cover clip attached to the license plate frame in an embodiment of the invention. FIG. 3B shows a perspective view of the back side of the cover clip shown in FIG. 3A in an embodiment of the invention. Referring now to FIGS. 3A and 3B, cover clip 14 is of a first style. On the back side of cover clip 14 is a raised catch bar 16. Channels 18 are located on raised portions 19 on each side of cover clip 14. How cover clips 14 are installed on brackets 4 of license plate frame 2 is a first unique method. License plate frame 2 with brackets 4 is designed to work with cover clips 14 such that cover clips 14 will only work on the specially designed brackets 4 of license plate frame 2. As shown in FIG. 6, cover clips 14 are slid up onto the brackets 4 in a parallel direction to the license plate frame 2, or stated differently, in the same plane as the license plate frame 2, as opposed to being pushed on perpendicularly to the license plate frame 2, which is how many prior art cover clips are designed. Channels 18 engage with tabs 8 on brackets 4, securing cover clip 14 from moving horizontally on brackets 4. As cover clip 14 is being slid onto brackets 4, raised catch bar 16 that is perpendicular to the raised portions 19 confronts raised bar 12 on license plate frame 2 and engages with the raised bar 12. Cover clip 14 is made of a material, such as plastic, and has a flexible property so that the cover clip 14 can be flexed so that the catch bar 16 can be lifted up and over raised bar 12 and then abut against raised bar 12 when the flexing is released, securing cover clip 14 from moving more vertically on bracket 4.

Figure 4A:
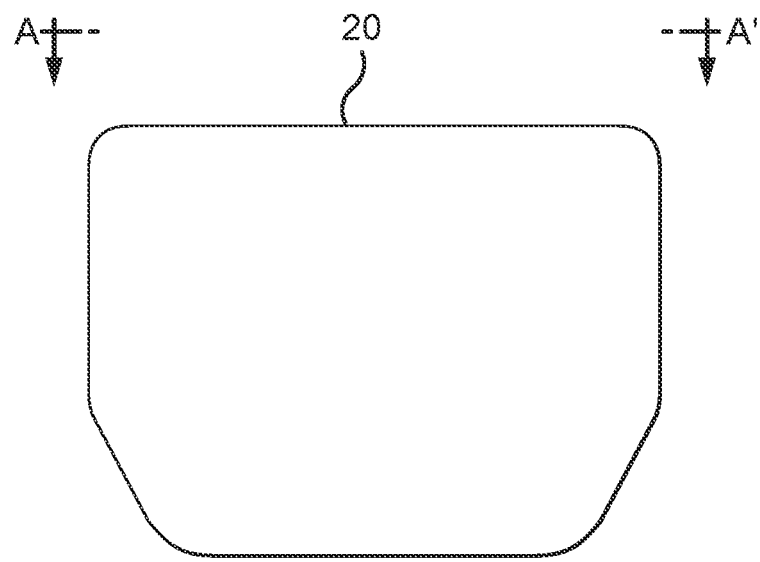
FIG. 4A shows a front view of a second style of a cover clip in an embodiment of the invention.
Figure 4B:
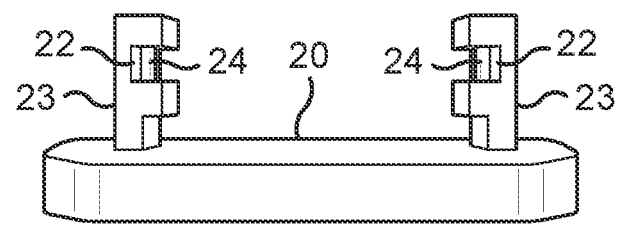
FIG. 4B shows a top slight perspective view of the cover clip shown in FIG. 4A viewed along line A-A' in an embodiment of the invention.

FIG. 4A shows a front view of a second style of a cover clip in an embodiment of the invention. FIG. 4B shows a top slight perspective view of the cover clip shown in FIG. 4A viewed along line A-A' in an embodiment of the invention. Referring now to FIGS. 4A and 4B, cover clip 20 is of a second style. Channels 22 are located on raised portions 23 on each side of cover clip 20. Within each channel 22 is a raised nub 24. How cover clips 20 are installed on license plate frame 2 involves a second unique method. Brackets 4 are designed to work with cover clips 20 such that cover clips 20 will only work on the specially designed brackets 4 of license plate frame 2. As shown in FIG. 6, cover clip 20 is slid down onto the bracket 4 in a parallel direction to the license plate frame 2, or stated differently, in the same plane as the license plate frame 2, as opposed to being pushed on perpendicularly to the license plate frame 2, which is how many prior art cover clips are designed. Channels 22 engage with tabs 8 on brackets 4, and securing cover clip 20 from moving horizontally on brackets 4. As cover clip 20 is being slid onto brackets 4, raised nubs 24 slide against tapered tabs 8 causing raised portions 23 to bow out until raised nubs 24 snap into notches 10 of tapered tabs 8. Cover clip 20 is made of a material, such as plastic, and has a flexible property so that raised portions 23 can bow out and snap back as raised nubs 24 slide along tabs 8 when the bowing is released by the raised nubs 24 snapping into notches 10. Once raised nubs 24 are secured into notches 10 cover clip 20 is prevented from moving any more vertically on brackets 4.

Figure 5A:
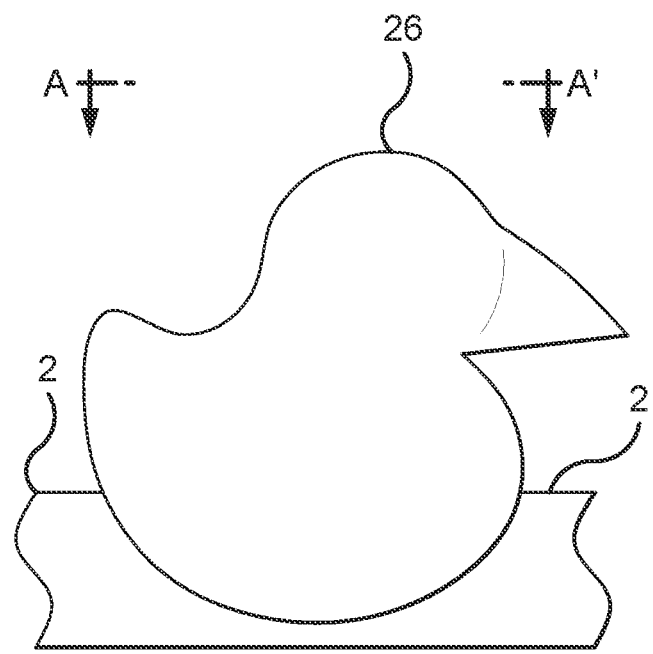
FIG. 5A shows a front view of a third style of a cover clip in an embodiment of the invention.
Figure 5B:
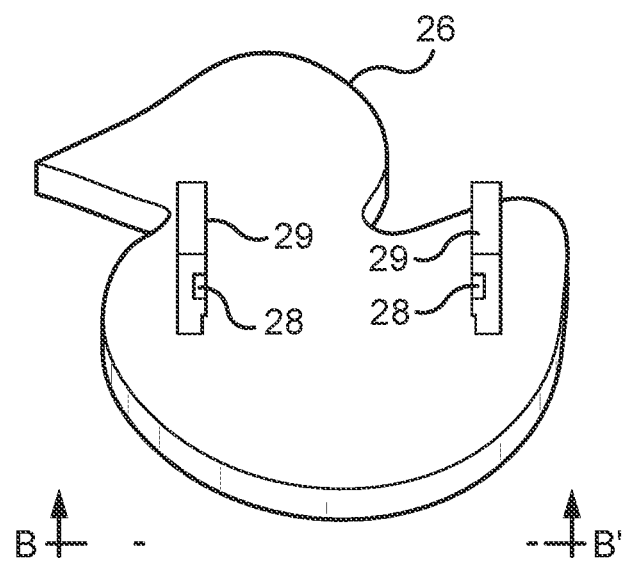
FIG. 5B shows a perspective view of the back side of the cover clip shown in FIG. 5A in an embodiment of the invention.
Figure 5C:
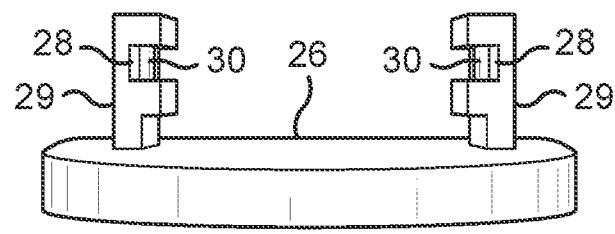
FIG. 5C shows a top slight perspective view of the cover clip shown in FIG. 5A viewed along line B-B' in an embodiment of the invention.
Figure 5D:
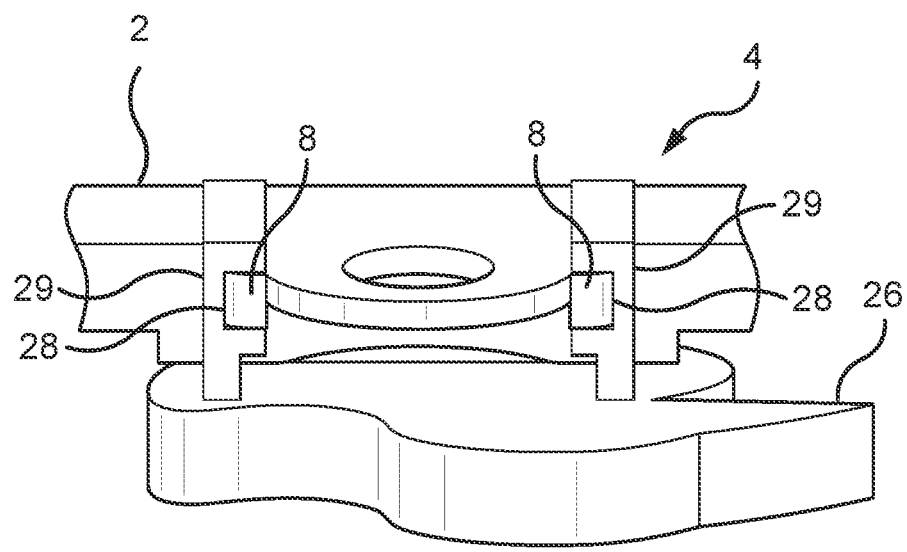
FIG. 5D shows a top slight perspective view of the cover clip shown in FIG. 5A viewed along line A-A' attached to a bracket of the license plate frame in an embodiment of the invention.

FIG. 5A shows a front view of a third style of a cover clip in an embodiment of the invention. FIG. 5B shows a perspective view of the back side of the cover clip shown in FIG. 5A in an embodiment of the invention. FIG. 5C shows a top slight perspective view of the cover clip shown in FIG. 5B viewed along line B-B' in an embodiment of the invention. FIG. 5D shows a top slight perspective view of the cover clip shown in FIG. 5A viewed along line A-A' attached to a bracket of the license plate frame in an embodiment of the invention. Referring now to FIGS. 5A, 5B, 5C, and 5D, cover clip 26 is of a third style. One skilled in the art will recognize that many different styles of cover clips can be conceived to have various shapes. The three styles shown in this disclosure are for illustration purposes only and the cover clips are not limited to these three exemplary styles disclosed.

Channels 28 are located on raised portions 29 on each side of cover clip 26. Within each channel 28 is a raised nub 30. How cover clips 26 are installed on license plate frame 2 involves the second unique method. Brackets 4 are designed to work with cover clips 26 such that cover clips 26 will only work on the specially designed brackets 4 of license plate frame 2. As shown in FIG. 6, cover clip 26 is slid down onto the bracket 4 in a parallel direction to the license plate frame 2, or stated differently, in the same plane as the license plate frame 2, as opposed to being pushed on perpendicularly to the license plate frame 2, which is how many prior art cover clips are designed. Channels 28 engage with tapered tabs 8 on brackets 4, and securing cover clip 26 from moving horizontally on brackets 4. As cover clip 26 is being slid onto bracket 4, raised nubs 24 slide against tapered tabs 8 causing raised portions 29 to bow out until raised nubs 24 snap into notches 10 of tapered tabs 8. Cover clip 26 is made of a material, such as plastic, and has a flexible property so that raised portions 29 can bow out and snap back as raised nubs 24 slide along tapered tabs 8 when the bowing is released by the raised nubs 24 snapping into notches 10. Once raised nubs 24 are secured into notches 10 cover clip 26 is prevented from moving any more vertically on brackets 4.

One skilled in the art will recognize that the first unique method can be combined with the second unique method such that the raised catch bar 16 shown on cover clip 14 can be incorporated into cover clip 20 and cover clip 26 to engage with the raised bar 12 on license plate 2 along with the raised nubs 24/30 that engage with the notches 10 on brackets 4.

FIG. 6 shows a front view of a license plate frame having the cover clips shown in FIGS. 3A, 4A, and 5A attached to the specially designed brackets of the license plate frame shown in FIG. 1 in an embodiment of the invention. Referring now to FIG. 6, two cover clips 14 of the first style are shown attached to the top brackets 4 of the license plate frame 2. One cover clip 20 of the second style is shown attached to the lower left bracket 4 of the license plate frame 2. One cover clip 26 of the third style is shown attached to the lower right bracket 4 of the license plate frame 2. One skilled in the art will recognize that all four cover clips could be the same, or any combination of two, three, or four styles of cover clips.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. An apparatus comprising:
    a license plate frame, the license plate frame further comprising:
        at least one bracket located on an interior edge of the license plate frame, the at least one bracket further comprising:
            a first tab located on a first side of the at least one bracket wherein the first tab has a first notch on a first outside edge of the first tab; and
            a second tab located on a second side of the at least one bracket wherein the second tab has a second notch on a second outside edge of the second tab; and
    a cover clip, the cover clip further comprising:
        a first raised portion having a first channel with a first raised nub within the first channel, wherein the first channel receives the first tab securing the cover clip from moving horizontally on the at least one bracket, and the first raised nub within the first channel snaps into the first notch of the at least one bracket; and
        a second raised portion having a second channel with a second raised nub within the first channel, wherein the second channel receives the second tab securing the cover clip from moving horizontally on the at least one bracket, and the second raised nub within the first channel snaps into the second notch of the at least one bracket.

2. The apparatus according to claim 1 further comprising:
    at least two brackets located on an interior edge at the top of the license plate frame; and
    at least two brackets located on an interior edge at the bottom of the license plate frame.

3. The apparatus according to claim 1 further comprising:
    an opening in the at least one bracket that aligns with a preexisting hole in a license plate.

4. The apparatus according to claim 1 wherein the first tab has a slight taper such that a bottom part of the first tab toward a base of the license plate frame is wider than a top part of the first tab farther away from the base of the license plate frame.

5. The apparatus according to claim 1 wherein the second tab has a slight taper such that a bottom part of the second tab toward a base of the license plate frame is wider than a top part of the second tab farther away from the base of the license plate frame.

6. The apparatus according to claim 1 wherein the cover clip further comprises a flexible property so that the first raised portion and the second raised portion can bow out and snap back as first raised nub and second raised nub slide along first tab and second tab and snap into the first notch and the second notch and prevent the cover clip from moving any more vertically on the at least one bracket.

* * * * *

UNITED STATES PATENT AND TRADEMARK OFFICE
CERTIFICATE OF CORRECTION

| | | |
|---|---|---|
| PATENT NO. | : 12,103,472 B1 | |
| APPLICATION NO. | : 18/497710 | |
| DATED | : October 1, 2024 | |
| INVENTOR(S) | : Todd R. Spencer et al. | |

It is certified that error appears in the above-identified patent and that said Letters Patent is hereby corrected as shown below:

In the Claims

<u>Column 6,</u>
Line 50, Add the word – the – after the word "as" and before the word "first".
Line 50, Add the word – the – after the word "and" and before the word "second".
Line 51, Add the word – the – after the word "along" and before the word "first".
Line 51, Add the word – the – after the word "and" and before the word "second".

Signed and Sealed this
Nineteenth Day of November, 2024

*Katherine Kelly Vidal*

Katherine Kelly Vidal
*Director of the United States Patent and Trademark Office*